United States Patent
Hou et al.

(10) Patent No.: US 7,839,585 B2
(45) Date of Patent: Nov. 23, 2010

(54) VOICE COIL MOTOR TYPE FOCUSING ACTUATOR

(75) Inventors: Jen-Chieh Hou, Changhua County (TW); Chin-Chien Liu, Changhua County (TW); Chin-Hsing Ho, Taipei (TW)

(73) Assignee: Tricore Corporation, Changhua County (TW)

( * ) Notice: Subject to any disclaimer, the term of this patent is extended or adjusted under 35 U.S.C. 154(b) by 185 days.

(21) Appl. No.: 12/076,293

(22) Filed: Mar. 17, 2008

(65) Prior Publication Data

US 2008/0231975 A1 Sep. 25, 2008

(30) Foreign Application Priority Data

Mar. 20, 2007 (TW) .............................. 96204503 U

(51) Int. Cl.
*G02B 7/02* (2006.01)
(52) U.S. Cl. ...................... 359/824; 359/819; 359/823
(58) Field of Classification Search ................. 359/819, 359/822–824
See application file for complete search history.

(56) References Cited

U.S. PATENT DOCUMENTS

| | | | | |
|---|---|---|---|---|
| 5,220,461 A | * | 6/1993 | Inoue et al. | 359/824 |
| 5,471,100 A | * | 11/1995 | Sakamoto et al. | 310/12.04 |
| 5,541,777 A | * | 7/1996 | Sakamoto et al. | 359/824 |
| 5,663,843 A | * | 9/1997 | Ezawa et al. | 359/824 |
| 5,828,503 A | * | 10/1998 | Kaneda et al. | 359/824 |
| 7,394,603 B2 | * | 7/2008 | Shiraki et al. | 359/819 |
| 7,400,068 B2 | * | 7/2008 | Tseng | 310/12.16 |
| 2007/0053082 A1 | * | 3/2007 | Sue et al. | 359/819 |
| 2007/0097530 A1 | * | 5/2007 | Kuo et al. | 359/823 |
| 2007/0133110 A1 | * | 6/2007 | Huang | 359/824 |

* cited by examiner

*Primary Examiner*—Jessica T Stultz
*Assistant Examiner*—Mahidere S Sahle
(74) *Attorney, Agent, or Firm*—Bacon & Thomas, PLLC

(57) ABSTRACT

A voice coil motor type focusing actuator, which includes a fixed unit, the fixed unit comprises a receiving chamber, a slide fitting channel, a first coil, and a magnet. A movable unit, the movable unit is received inside the receiving chamber of the fixed unit, having a first magnetic conducting flange being affected by the first coil and magnet of the fixed unit, a lens receiving means, a slide fitting rail, the movable unit is movable relative to the fixed unit to define an axial line.

19 Claims, 7 Drawing Sheets

VOICE COIL MOTOR TYPE FOCUSING ACTUATOR

BACKGROUND OF THE INVENTION

1. Field of the Invention

The present invention relates to voice coil motor and more particularly, to a voice coil motor type focusing actuator.

2. Description of the Related Art

A conventional voice coil motor type focusing actuator essentially comprises a fixed unit and a movable unit movably mounted in the fixed unit. A coil and a magnet are mounted on the fixed unit and the movable unit respectively.

Conventional voice coil motor type focusing actuators have the common drawback of complicated structure, resulting in a complicated installation procedure. Further, improper connection among parts causes instability of the structure. Further, these conventional voice coil motor type focusing actuators cannot provide a good magnetic effect.

Therefore, it is desirable to provide a voice coil motor type focusing actuator that eliminates the aforesaid drawbacks.

SUMMARY OF THE INVENTION

The present invention has been accomplished under the circumstances in view. It is one object of the present invention to provide an actuator, which has the coil and magnet being mounted on the fixed unit or movable unit at the same time, for simplify the structure and evaluate the magnetic conducting effect.

It is another object of the present invention to provide an actuator, which provides a magnetic conducting flange of the fixed unit and the movable unit, the magnetic conducting flange prompting the magnetic force and preventing intake of the article or dust.

It is still another object of the present invention to provide an actuator, which the coil can be mounted on a bobbin, then simplified the assembly and lowering the cost.

To achieve these and other objects of the present invention, the voice coil motor type focusing actuator comprises a fixed unit, the fixed unit comprises a receiving chamber, a slide fitting channel, a first coil, and a magnet. A movable unit, the movable unit is received inside the receiving chamber of the fixed unit, having a first magnetic conducting flange being affected by the first coil and magnet of the fixed unit, a lens receiving means, a slide fitting rail, the movable unit is movable relative to the fixed unit to define an axial line.

DETAILED DESCRIPTION OF THE INVENTION

Figure 1:
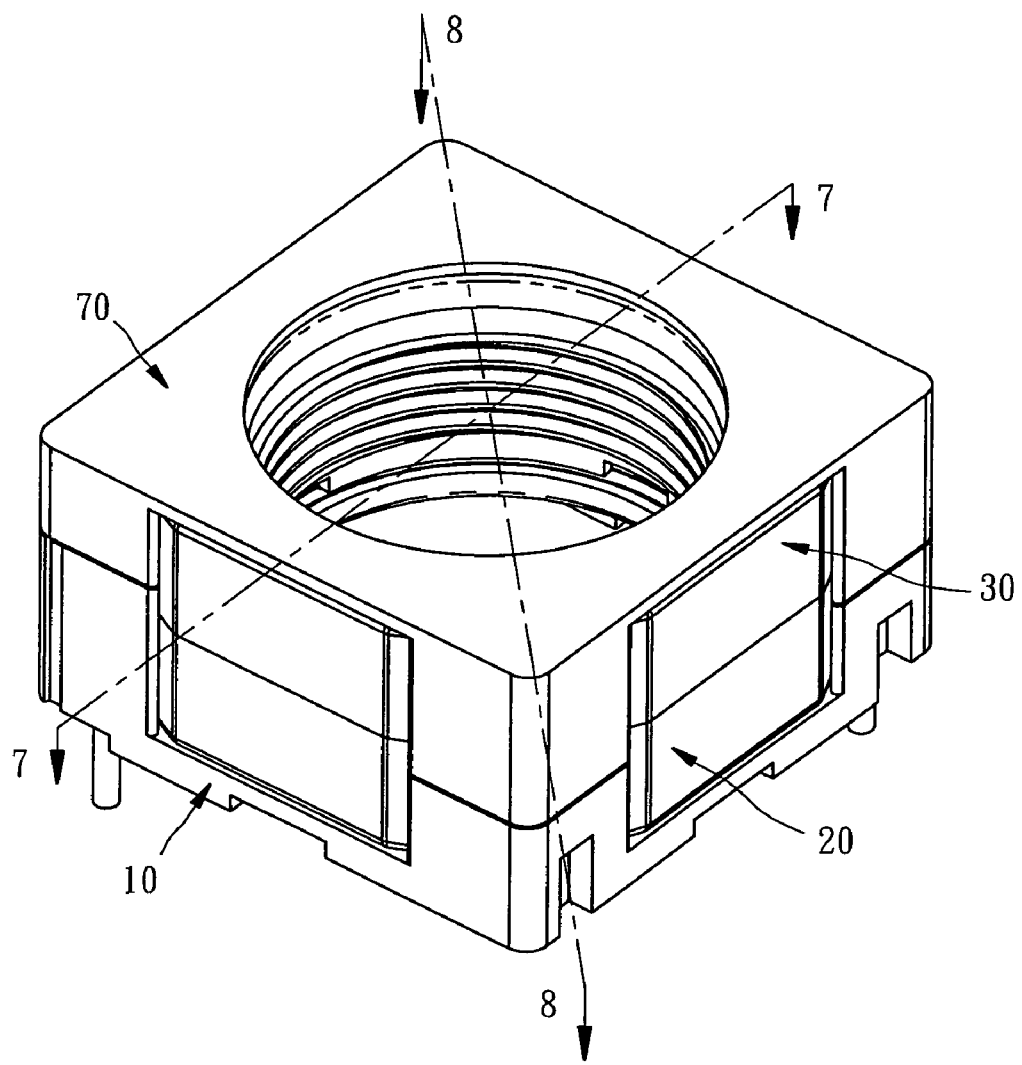
FIG. 1 is a perspective view of an actuator according to the present invention.
Figure 2:
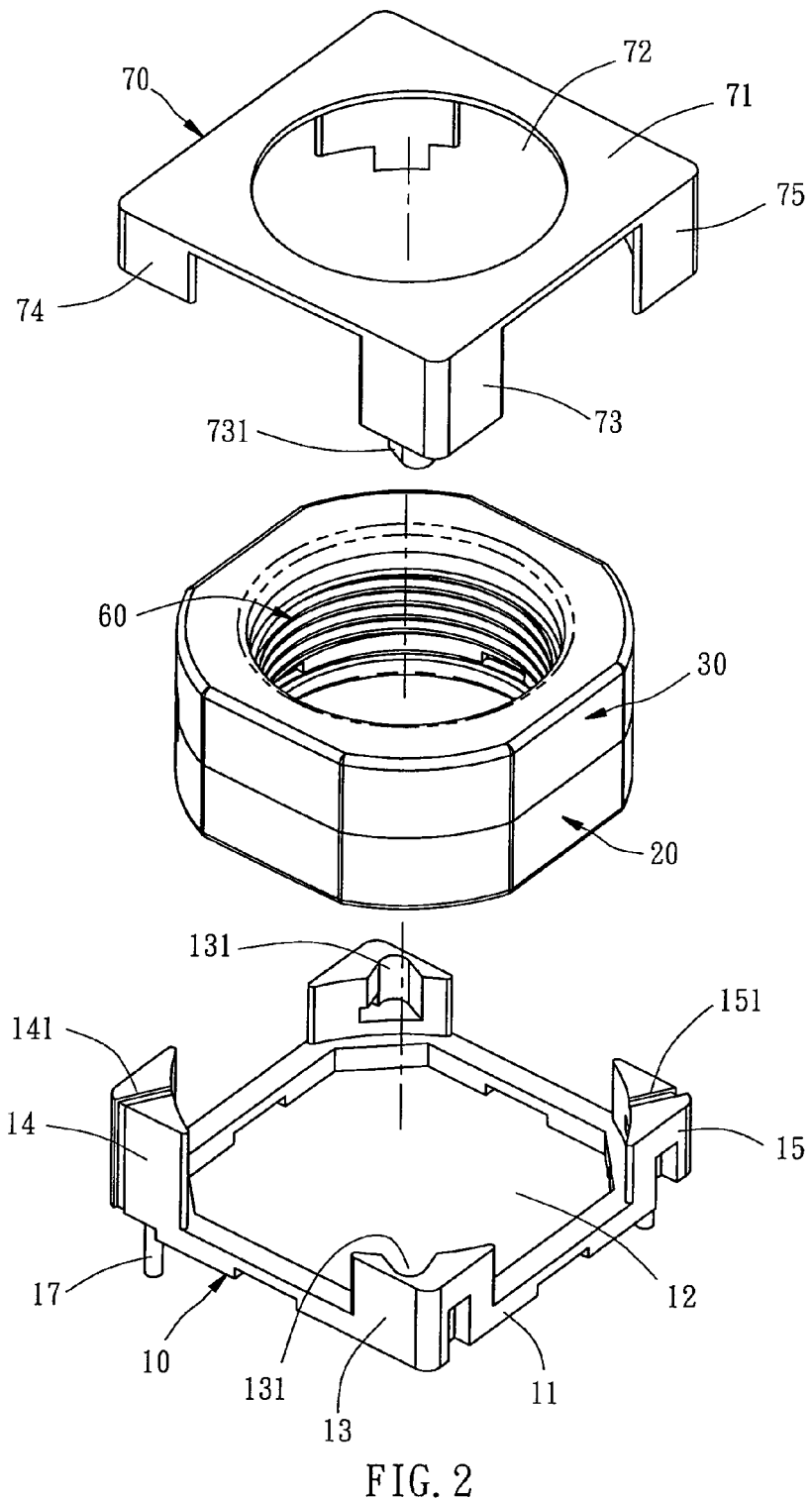
FIG. 2 is another perspective view of an actuator according to the present invention.
Figure 3:
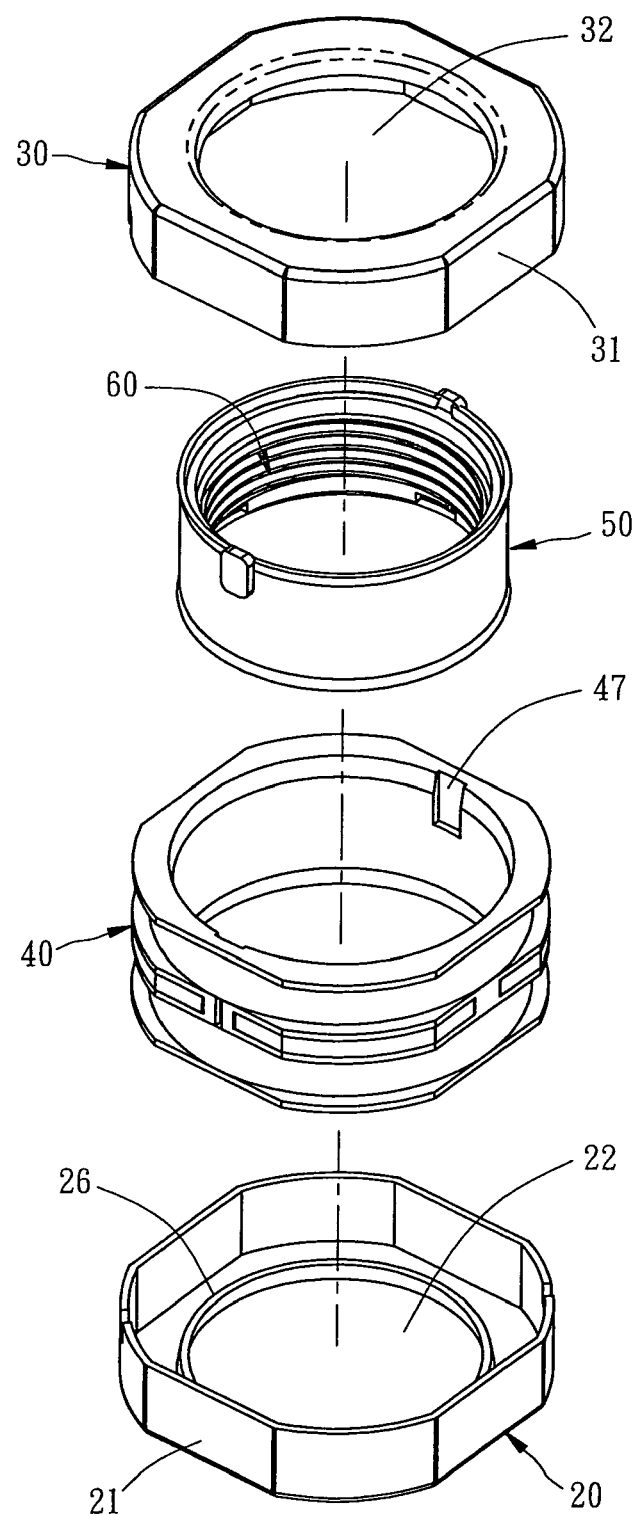
FIG. 3 is a partial exploded view of the actuator of FIG. 2.
Figure 4:
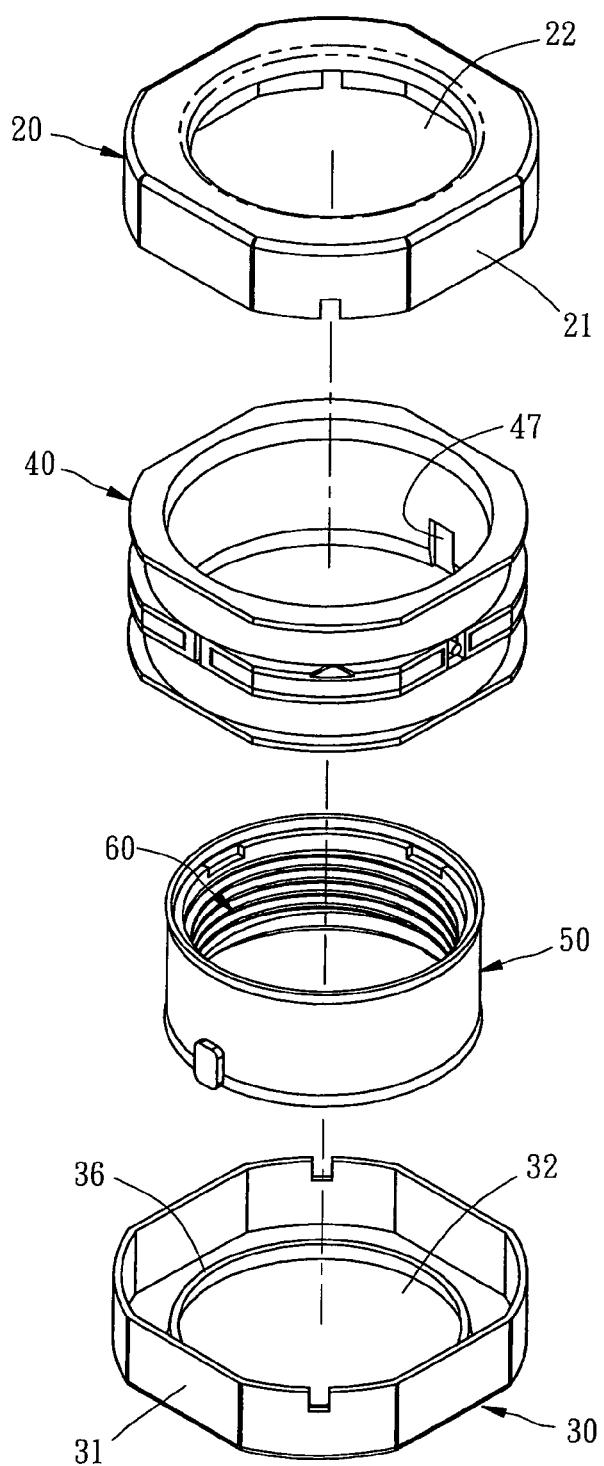
FIG. 4 is another direction exploded view of the actuator of FIG. 3.
Figure 5:
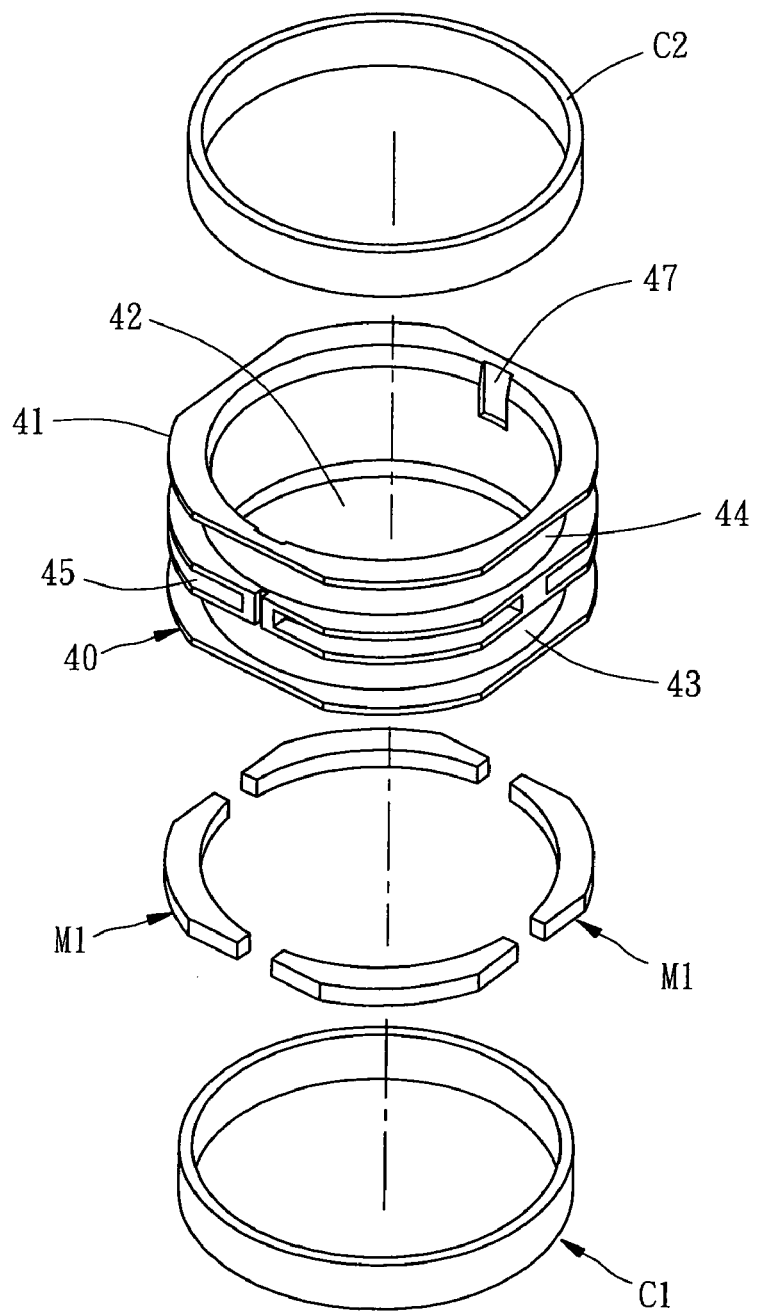
FIG. 5 is a partial exploded view of the actuator of FIG. 3.
Figure 6:
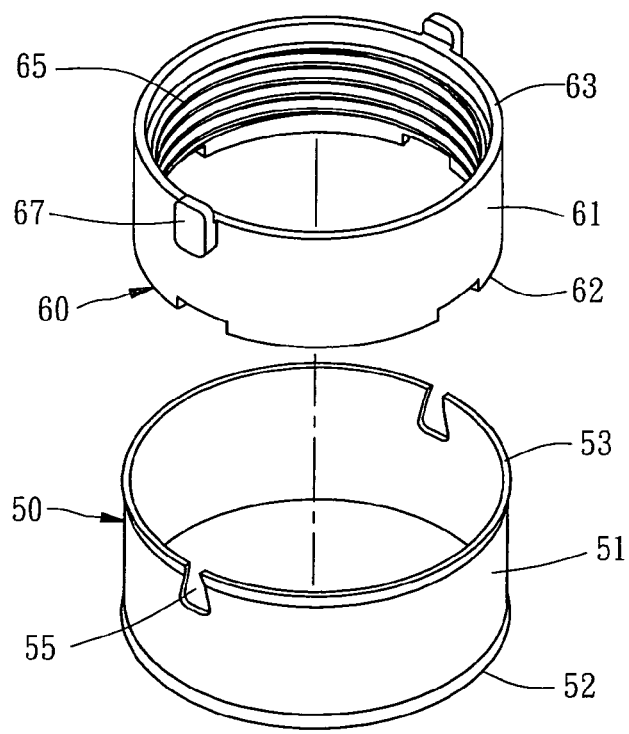
FIG. 6 is another partial exploded view of the actuator of FIG. 3.
Figure 7:
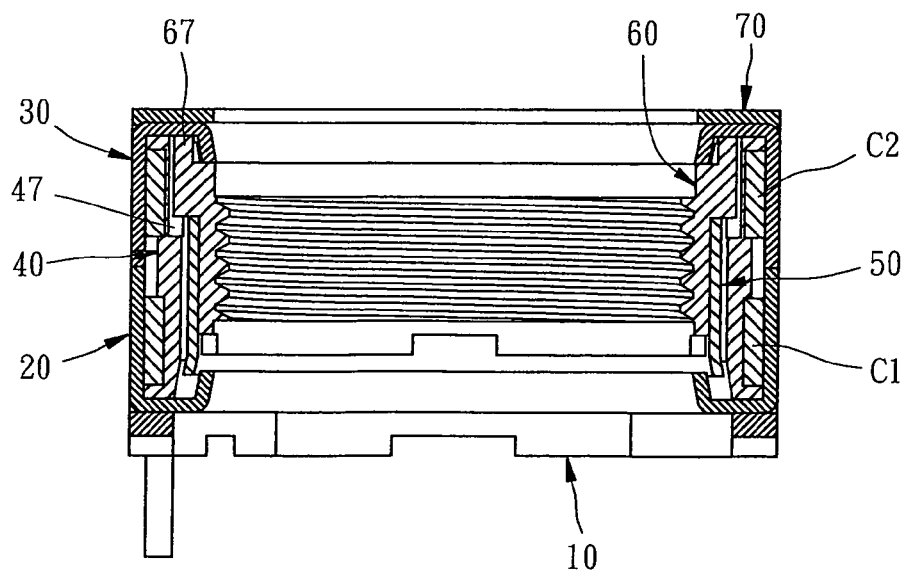
FIG. 7 is a sectional view taken along line 7-7 of FIG. 1.

Referring to FIGS. 1-7, a voice coil motor type focusing actuator in accordance with a preferred embodiment of the present invention is shown comprising a first cover 10, a first bracket 20, a second bracket 30, four magnets M1, a bobbin 40, a first coil C1, a second coil C2, a holder conductor 50, a lens holder 60 and a second cover 70.

The first cover 10 comprises a bottom panel 11, an escape hole 12 cut through the center of the bottom panel 11, two coupling legs 13, two locating sockets 131 each formed on the coupling legs 13 respectively, two opposite first conjunction legs 14 and 15 perpendicularly extend from two opposite peripheral corners of the bottom panel 11, each of the first conjunction legs 14 and 15 forms a wire receiving slot 141 and 151, and two electric conducting pins 17.

The first bracket 20 and the second bracket 30 each comprises a frame body 21 and 31, an accommodation receiving chamber 22 and 32 defined in the frame body 21 and 31, a first magnetic conducting flange 23 and a second magnetic conducting flange 33 formed of a slop surface opposite outwardly, a first stop edge 26 and a second stop edge 36 defined at an end of the first and second magnetic conducting flanges 23 and 33 respectively.

Wherein the first bracket 20 and the second bracket 30 can construct a bracket unit, and the bracket unit formed a receiving chamber inside.

The bobbin 40 has a bobbin barrel 41 mounted between the first bracket 20 and the second bracket 30, a receiving room 42, two coil winding grooves 43 and 44, four magnet mounting slots 45, and two slide fitting channels 47.

The first coil C1 and the second coil C2 is wound on the coil winding groove 43 and 44 of the bobbin 40 at the sides corresponding to the magnets M1, the first coil C1 and the second coil C2 is conducted to the two electric conducting pins 17 respectively; The two coils C1 and C2 can construct a coil conduction unit.

The magnets M1 are respectively mounted in the magnet mounting slots 45 of the bobbin 40. And let the N port of all magnets M1 facing inwards and the S port facing outwards. On the other hand, still can let the N port of all magnets M1 facing outwards and the S port facing inwards.

Moreover, the bracket unit, the coil conduction unit and the magnets can construct a fixed unit.

The holder conductor 50 is magnetic conductive and hollow inserted to the receiving room 42 of the bobbin 40, the holder conductor 50 has a barrel body 51, a first magnetic conducting flange 52 and a second magnetic conducting flange 53 outwardly expended at two distal ends and approximately paralleled to the first magnetic conducting flange 23 and the second magnetic conducting flange 33 respectively, two lockable slots 55.

The lens holder 60 comprises a holder shell 61 formed by plastic injection molding to wrap inside the holder conductor 50, a first stop edge 62 and a second stop edge 63, a lens receiving means, for example, a screw hole 65 formed in the holder shell 61 for receiving a lens (not shown), and two slide fitting rails 67 of rectilinear shape disposed on the outside wall thereof at two opposite sides and respectively coupled to the slide fitting channels 47 of the bobbin 40.

Wherein the holder conductor 50 and the lens holder 60 can construct a movable unit.

The second cover 70 comprises a body 71 covered on the top side of the bracket 20, an escape hole 72 corresponding to the screw hole 65 of the lens holder 60, two locating holes 73 respectively fastened to the coupling legs 13 of the first cover 10, two locating blocks 731 insertion with corresponding locating sockets 131, two second conjunction legs 74 and 75 perpendicularly extend from the two opposite peripheral corners of the body 71 and supported by each of the first conjunction legs 14 and 15 of the first cover 10.

Further, the first cover 10 and the second cover 70 can constitute a carrier unit.

Figure 8:
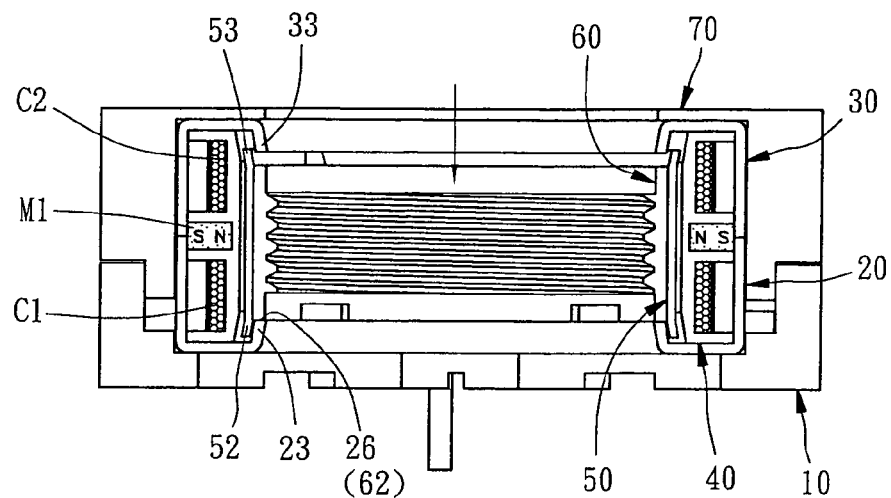
FIG. 8 is a sectional view taken along line 8-8 of FIG. 1, showing the movable unit positioned to a first position.

As shown in FIG. 8, when electric current is connected to the first coil C1 and the second coil C2, the first coil C1 and the second coil C2 are excited to act upon the magnets M1, thereby producing a magnetic force to move down the lens holder 60 with the slide fitting rails 67 along the two slide fitting channels 47 of the bobbin 40, until the first stop edge 62 of the lens holder 60 stop against the first stop edge 26 of the first bracket 20, the lens holder 60 then positioned at a first locating position. Wherein the magnetic force of the first coil C1 and the second coil C2 is larger than the magnets M1.

Figure 9:
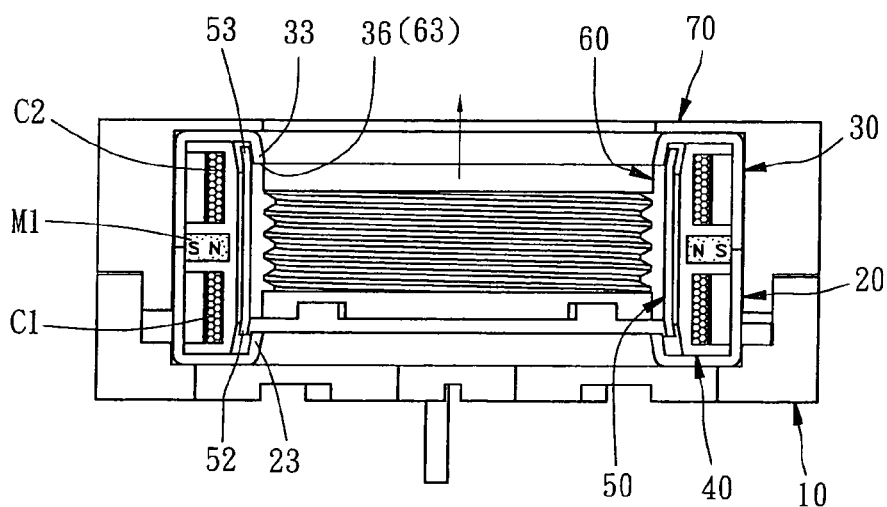
FIG. 9 is similar to FIG. 8, but showing the movable unit positioned to a second position.

On the contrary, as shown in FIG. 9, when the first coil C1 and the second coil C2 are conducted in a converse electric current, the first coil C1 and the second coil C2 are excited to act upon the magnets M1, thereby producing a magnetic force to move upon the lens holder 60 with the slide fitting rails 67 along the two slide fitting channels 47 of the bobbin 40, until the second stop edge 63 of the lens holder 60 stop against the second stop edge 36 of the second bracket 30, the lens holder 60 then positioned at a second locating position.

When lens holder 60 positioned on the first locating position or the second locating position, the first coil C1 and the second coil C2 did not need to conduct current further; because the magnets M1 is at the middle, the gap between the first magnetic conducting flange 23 of the first bracket 20 and the first magnetic conducting flange 52 of the holder conductor 50 is different from the gap between the second magnetic conducting flange 33 of the second bracket 30 and the second magnetic conducting flange 53 of the holder conductor 50 at the same time, the bigger the gap, where there the magnetic force from the magnets M1 is smaller, the smaller the gap, where there the magnetic force from the magnets M1 is larger, then achieve the magnets M1 to control the lens holder 60 holding on the first locating position or second locating position.

Moreover, the first magnetic conducting flange 23 of the first bracket 20 and the second magnetic conducting flange 33 of the second bracket 30 both formed of a hook section, the first and second magnetic conducting flanges 52 and 53 of the holder conductor 50 formed of a predetermine slope surface, then preventing intake of the article or dust.

The actuator can imply hereafter.

First, the actuator comprised only the first coil, but no the second coil.

Second, the magnets, the first coil and the second coil can mount on the movable unit but not the fixed unit for different design.

Further, there is no need of the bobbin, but the magnets, the first coil and the second coil are mounted on the bracket unit, that is the first bracket and the second bracket; and both of the magnets and the coils are mounted inside or outside the bracket unit, or one of the magnets and the coils inside and the other outside the bracket unit.

And, there is no need of the first cover 10 and the second cover 70, and the actuator can directly mounted to the camera or phone.

Still further, the first and second magnetic conducting flanges of the fixed unit and the movable unit are formed of an arch flange relatively, and the first and second magnetic conducting flanges can be another shape which achieves the function of enhancing the magnetic conducting effect.

As indicated above, the invention provides a voice coil motor type focusing actuator, which has the following benefits:

1. The coil and the magnet are mounted on the fixed unit or movable unit at the same time, for simplify the structure and evaluate the magnetic conducting effect.

2. The a magnetic conducting flange of the fixed unit and the movable unit, the magnetic conducting flange prompting the magnetic force and preventing intake of the article or dust.

3. The coil can be mounted on a bobbin, and then simplified the assembly and lowering the cost.

What is claimed is:

1. A voice coil motor type focusing actuator comprising:
a fixed unit, said fixed unit comprising a receiving chamber, a slide fitting channel, a first coil, and a magnet; and
a movable unit, said movable unit being received inside said receiving chamber of the fixed unit, having a first magnetic conducting flange being affected by said first coil and magnet of the fixed unit, a lens receiving means, a slide fitting rail, said movable unit being movable relative to said fixed unit to define an axial line;
wherein said fixed unit further comprises a first magnetic conducting flange, a gap variably defined between said first magnetic conducting flange of the movable unit and said first magnetic conducting flange of the fixed unit while the fixed unit and movable unit moving relative to each other along the axial line.

2. The actuator as claimed in claim 1, wherein said fixed unit further comprises a bobbin mounted inside said receiving chamber, said first coil is mounted on the bobbin.

3. The actuator as claimed in claim 1, wherein said fixed unit further comprises a bobbin mounted inside said receiving chamber, said magnet is mounted on the bobbin.

4. The actuator as claimed in claim 1, wherein said fixed unit further comprises a bobbin mounted inside said receiving chamber, said first coil and the magnet are mounted on the bobbin.

5. The actuator as claimed in claim 1, wherein said fixed unit further comprises a second coil, said first coil and the second coil mounted at two sides of the magnet respectively.

6. The actuator as claimed in claim 2, wherein said fixed unit further comprises a second coil mounted on the bobbin, said first coil and the second coil mounted at two sides of the magnet respectively.

7. The actuator as claimed in claim 1, wherein said movable unit further comprises a holder conductor, and a lens holder connected to said holder conductor.

8. The actuator as claimed in claim 1, wherein said first magnetic conducting flange of the fixed unit is formed of a slop surface.

9. The actuator as claimed in claim 8, wherein said first magnetic conducting flange of the movable unit is sloped at the same direction with said first magnetic conducting flange of the fixed unit.

10. The actuator as claimed in claim 1, wherein said movable unit further comprises a second magnetic conducting flange, said fixed unit further comprises a second magnetic conducting flange relative to said second magnetic conducting flange of the movable unit.

11. The actuator as claimed in claim 10, wherein said second magnetic conducting flange of the movable unit is formed at a direction opposite from the first magnetic conducting flange of the movable unit perpendicular to the axial direction.

12. The actuator as claimed in claim 11, wherein said second magnetic conducting flange of the movable unit is sloped at the same direction with said second magnetic conducting flange of the fixed unit.

13. The actuator as claimed in claim 11, wherein said magnet is located at a middle position between said first and second magnetic conducting flanges of the fixed unit.

14. The actuator as claimed in claim 1, wherein said fixed unit further comprises a first stop edge, said movable unit further comprises a first stop edge, when said first stop edge of the movable unit stop against the first stop edge of the fixed unit, the movable unit then positioned at a first locating position.

15. The actuator as claimed in claim 14, wherein said fixed unit further comprises a second stop edge, said movable unit further comprises a second stop edge, when said second stop edge of the movable unit stop against the second stop edge of the fixed unit, the movable unit then positioned at a second locating position.

16. The actuator as claimed in claim 1, wherein said fixed unit further comprises a bracket unit, said bracket unit covered on said first coil and the magnet.

17. The actuator as claimed in claim 1, wherein said fixed unit further comprises a bracket unit, said bracket unit has a first bracket and the second bracket connected to said first bracket.

18. The actuator as claimed in claim 1, further comprising a carrier unit for mount of said fixed unit.

19. The actuator as claimed in claim 18, wherein said carrier unit further comprising a first cover, and a second cover assembled on said first cover.

* * * * *